C. H. Kupfer.
Lamp Burner.

Nº 40,050.   Patented Sep. 22, 1863.

Witnesses
Andrew J. Todd
Henrick Dodge

Inventor.
Charles Heinrich Kupfer

UNITED STATES PATENT OFFICE.

CHARLES H. KUPFER, OF HOBOKEN, NEW JERSEY.

IMPROVEMENT IN LAMP-BURNERS.

Specification forming part of Letters Patent No. 40,050, dated September 22, 1863.

*To all whom it may concern:*

Be it known that I, CHARLES HEINRICH KUPFER, of Hoboken, in the county of Hudson and State of New Jersey, have invented a new and useful Improvement in the Construction of Burners for Kerosene or Coal-Oil Lamps; and I do hereby declare that the following is a full, clear, and exact description of the same, reference being had to the drawings which accompany and form a part of the specification.

Figure 1:
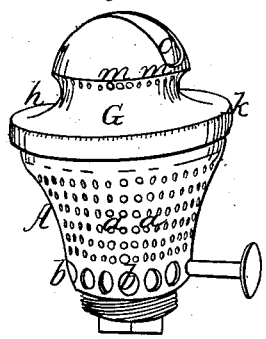
Figure 2:
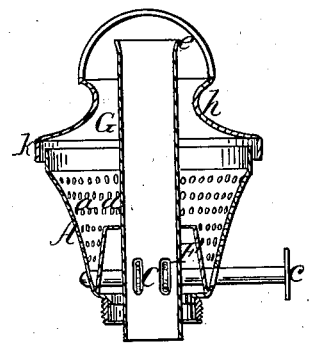
Figure 3:
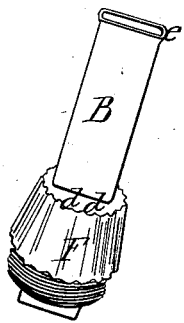
Figure 4:
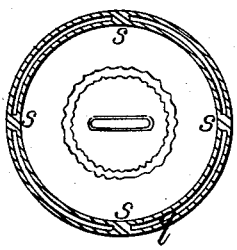

Of the drawings, Figure 1 is a vertical section through the center of the wick-tube, showing the fluted interior cone, F, and also representing the peculiar shape of the deflecting-cap G. Fig. 2 is an inside elevation of one-half of the burner with the wick-tube and cone F removed so as to show more plainly the manner in which I arrange the perforations through which the external air is supplied to the flame. This figure also represents the manner in which the deflecting-cap is attached to the body of the burner. Fig. 3 is a plan of the cone F.

The chief characteristic of my invention consists in providing a means of concentrating into a central vertical column the air which flows in through the outer perforations of the burners, and in then causing this column to be drawn up with a strong draft and deflected upon the base of the flame in a large volume. In this way I am enabled by a device of simple construction and of few parts to secure a very thorough mingling of the oxygen of the air with the flame from the wick, thereby producing a light of far more than the usual intensity, clearness, and illuminating power.

My improvement also comprises a mode of preserving the body of the burner in a cooler state than is customary while the lamp is burning by so attaching it to the deflecting-cap that there shall be a ring or stratum of cold air as nearly all around between the base of the cap and the body of the burner as possible, so that by this interposition of non-conducting air heat from the flame is not conveyed to any injurious extent to the oil-reservoir, but the contents of the latter are kept cool and unvaporized. This last provision, as it greatly diminishes danger of explosion or of setting the oil in the reservoir on fire, renders my improved burner especially adapted for a hand-lamp in families.

It is well known that a glass chimney becomes less essential in coal-oil lamps when the parts of the lamp are so arranged that a sufficient quantity of oxygen is conveyed to the wick to supply the flame under all circumstances, and when, either by means of perforations of the requisite number and fineness, or by some equivalent therefor, this air shall be so supplied as to prevent sudden gusts upon the flame, so that the latter will not be affeeted when the lamp is moved through the air.

In my improved burner I have had these considerations in view, and by my method of construction I am enabled to dispense with a chimney, which is one of the leading and most useful features of my invention.

To enable others to make and use my improvement, I will describe it in detail.

A is the body of the burner, the sides of which are perforated with a great number of small holes, *a a a*. B is a flat-wick tube, and C *c* are small serrated wheels and a thumb-piece for raising and lowering the wick, all these parts being the same as those commonly in use in coal-oil lamps, except that the upper end of the wick-tube is made flaring, as seen at *e*. Around the lower portion of the body of the burner, and below the series of perforations *a a a*, are one or more rows of larger perforations, *b b*, communicating with the external air. Within the body A, and attached to its lower part, is a cap, F, formed in the shape of the frustrum of a cone, having its exterior surface fluted or corrugated, as shown at *d d*. The wick-tube passes up through the center of this cone, F, and the shaft of the serrated wheels C also passes through it near its base.

G is a deflecting cap of peculiar shape. This cap, at about half-way of its height, is contracted and drawn inward, as shown at *h*, and then flares outward again below this contraction until at its base it becomes a little greater in diameter than the body of the burner and terminates in the rim or flange *k*, by means of which it is secured to the body A. At about the point where this contraction takes place one or more rows of small perforations are introduced, as represented at *m m*. The slit in the cap G, through which the flame passes, is made wider at the bottom, as seen at *o*, than it is at the top, and I prefer that the bottom of it, and also that the perforations $m\ m$, shall be about one-eighth of an inch below the upper end of the wick tube. As the flange $k$ of this cap G slightly exceeds in diameter the body A, as already mentioned, and, as the upper edge of the body A does not touch the cap G, as will be seen in Fig. 3, a small air-space, $q$, will be formed all around between the cap and the body, which are only connected at two, three, or four points, $s\ s\ s$, either by soldering, riveting, or in any other suitable manner, or by some insulating material or fastening, if preferred. By this means heat will to a great extent be prevented from being conducted to the oil in the reservoir.

The manner in which my improved burner operates will be readily understood. Air enters through the large perforations $b\ b$ by the fluting $d\ d$, compressed together and directed inward, and is carried toward the center from all sides and drawn upward in a concentrated column until it strikes the lower contracted part of the cap G, which in part deflects it from the base of the flame and in part spreads it in the chamber $y$, around the flame, thoroughly mixing it with the products of combustion. The rarefaction of the atmosphere around the flame causes this central air column to rush up with considerable force, and in the large quantities, due to the size of the perforations $b\ b$, the fluting of the exterior surface of the cap F facilitating its passage. Additional air also, of course, flows through the perforations $a\ a\ a$ and through the air-space $q$, and is operated upon by the cap G, and its contraction in the same way as the air previously referred to, while a still further supply enters by the upper holes, $m\ m$, and is, together with the rest of the contents of the chamber $y$, deflected upon the flame by the upper part of the cap G.

I deem the flutings of the cone F important, as, if the cone is plain on its exterior, the air will be spread around it instead of being concentrated. I prefer that there shall be one of these flutings opposite each of the perforations to $b$.

The small perforations $a\ a\ a$ and $m\ m$ and the contraction of the cap G serve to break the force of sudden currents of air to the flame, and thereby tend to prevent its being affected when the lamp is moved.

The flaring top of the wick-tube broadens the base of the flame, and, in connection with the thorough mingling of air on the outside of the latter by the cap, tends to consume all or nearly all of the smoke.

I do not claim the perforations $a\ a\ a$ or $b\ b$ or $m\ m$ considered by themselves; nor do I claim by itself the interposition of a non-conductor between the burner and the oil-reservoir; but What I do claim as my invention, and desire to secure by Letters Patent, is—

1. The arrangement within a burner of a fluted cone, F, constructed and operating substantially as set forth.

2. The deflecting-cap G when provided with a contraction, $h$, at about half-way of its height, but whether with or without the perforations $m\ m$, the whole constructed and operating substantially as described.

3. The combination, with said fluted cone F, of the perforations $b\ b$, operating as specified.

4. The combination of the fluted cone F, the cap G, contracted as described, and the perforations $b\ b$, the whole constructed and operating as above mentioned.

5. The arrangement set forth for attaching the cap G to the body A of the burner so as to form an air-space, $q$, to diminish the conduction of heat to the oil-reservoir.

CHARLES HEINRICH KUPFER.

Witnesses:
ANDREW J. TODD,
HERWICK DODGE.